UNITED STATES PATENT OFFICE.

SAMUEL GERARD McANALLY, OF HULL, QUEBEC, CANADA.

MANUFACTURE OF BRICKS AND FURNACE-LININGS FROM DEAD-BURNED MAGNESITE.

1,305,475.      Specification of Letters Patent.      Patented June 3, 1919.

No Drawing.      Application filed May 27, 1918. Serial No. 236,829.

*To all whom it may concern:*

Be it known that I, SAMUEL GERARD McANALLY, a subject of the King of Great Britain, and resident of the city of Hull, in the Province of Quebec, Dominion of Canada, have invented certain new and useful Improvements in Manufacture of Bricks and Furnace-Linings from Dead-Burned Magnesite, of which the following is a specification.

This invention relates to improvements in a process for manufacturing dead burned magnesite capable of being used for making fire bricks and furnace linings, and the objects of the invention are to produce a material which is refractory at the temperature of the steel furnace; is inert to the action of slags, limestone and molten metal, and when used for furnace linings will without the addition of any other material set or bind at a temperature slightly above the normal working temperature of the steel furnace.

In order that the magnesite may possess the above properties it is essential that it contain certain percentages of lime, silica, iron oxid and alumina and in such relative proportions that all the lime will form definite compounds with all the silica, iron oxid and alumina.

Uncombined lime will react with the molten metal and acid slags; uncombined silica, iron oxid and alumina will be attacked by the limestone in the charge and by basic slags; all these reactions produce one or more of the following results, disintegration of the magnesite, loss of metal, increase in volume of slags.

When the lime, silica, iron oxid and alumina are present in definite relative proportions the compounds formed from them are neutral and inert to the action of slags, limestone and molten metal at furnace temperature.

Their presence in the dead burned magnesite lowers the fusion point of the main body of magnesia, which is too refractory for the purposes required.

Iron oxid or alumina and silica when added to magnesia will also lower the fusion point, but as magnesia does not form compounds with them in the manufacturing processes the said iron oxid or alumina and silica remain in the free state, and will react with the limestone in the charge or with a basic slag and cause disintegration of the refractory material. In order to lower the fusion point of the dead burned magnesite to that degree where it is still sufficiently refractory, and where, at a temperature slightly higher than that of furnace working conditions, it will set and bind without the addition of other material, and still produce a material inert to the disintegrating action of slags, limestone and metal, the composition of the dead burned magnesite is controlled so as to contain 16 to 18 per cent. of lime, 6 to 6½ per cent. of silica and 8 to 8½ per cent. of iron oxid or alumina.

The proportions of silica, ferric oxid, and alumina may vary slightly but it is essential that they should aggregate 14 to 15 per cent.

The process of manufacturing consists in heating in kilns to incipient vitrifaction an intimate mixture of magnesite and other ingredients so that the resultant product of dead burned magnesite contains 16 to 18 per cent. of lime, 6 to 6½ per cent. of silica, 8 to 8½ per cent. of iron oxid and alumina, and 67 to 70 per cent. of magnesia.

This resultant material does not slake with water and contains less than point five (0.5) of insoluble or uncombined material and is highly refractory, is inert to the corrosive action of slags, limestone and molten metal, and when used for furnace linings will, without the addition of other materials set or bind at a temperature slightly above the normal working temperature of the steel furnace.

This product may be used for making bricks and is adapted to my improved method of making magnesite bricks.

The material is ground to a powder, when it is mixed with the required quantity of water to form a moist mass which is subsequently fed to a brick making machine and pressed into bricks, which are finally burned. I have found that a semi-dry mass gives good results in practice, as the brick is easily handled directly from the mold.

So that the improved method of manufacturing bricks will be thoroughly appreciated, it may be stated that heretofore in making magnesite fire bricks it was necessary to mix with dead burned magnesite a certain quantity of light burned magnesite, and add water to form the mixture into a paste which was subsequently molded into bricks and dried and burned to a high temperature.

The magnesites used were comparatively poor in lime and it has heretofore been deemed essential that the magnesite should not contain much lime, as otherwise they were considered unsuited for refractory purposes. It was therefore essential to add the light burned magnesite and water to form a binder, but by the present method, this addition of light burned magnesite is unnecessary.

It should also be borne in mind that great care is necessary to see that the magnesite is only light burned, for if the temperature is raised too high the magnesite loses its essential property and is unsuited for binding purposes. This involves great care, extra skilled labor, and a large technical staff and results in the brick being expensive.

Another method which has been attempted with very indifferent results and at considerable cost is to press the ground dead burned magnesite under very high pressure into a thin iron casing and burn the exposed ends so as to fuse the iron with the magnesite and form a seal.

The product is hardly what one would call a magnesite brick and the iron casing is bound to be attacked by basic slags and even melted at the high temperature of the steel furnace.

In the present method the dead burned magnesite containing lime, silica, iron oxid and alumina is, after being ground, mixed with water and pressed into bricks and dried and burned at a high temperature, an operation which is extremely simple and can be carried out much more quickly than the previously more involved methods of making bricks.

The advantage of bricks manufactured after my processes are that they are highly refractory at the temperature of the steel furnace and inert to the disintegration of slags, limestones, metals, etc., while the bricks possess high tensile and compression strength, and are very hard even after drying only, advantages over the bricks made by the former method above described.

Moreover the brick possesses a finish which can advantageously compare with magnesite bricks at present on the market.

What I claim as my invention is:

1. A new process of manufacturing magnesite bricks which consists in first dead burning magnesite with lime, iron oxid and silica, then grinding the resultant mixture to a powder, then mixing the powder with water then molding into bricks, drying and burning at a high temperature.

2. As an article of manufacture a dead burned magnesite containing 16 to 18% lime, 6 to 6½% silica, 8 to 8.5% iron oxid and alumina adapted to be used as a furnace lining and in brick making.

3. As a new article of manufacture a dead burned magnesite containing from 16 to 18% of lime and 14 to 15% of iron oxid, silica and alumina.

In witness whereof I have hereunto set my hand in the presence of a witness.

SAMUEL GERARD McANALLY.

Witness:
  JAMES MITCHELL.